US012172425B2

(12) United States Patent
Melotti

(10) Patent No.: US 12,172,425 B2
(45) Date of Patent: Dec. 24, 2024

(54) DRUM SUPPORT ASSEMBLY FOR A PRINTING MACHINE AND PRINTING MACHINE

(71) Applicant: BOBST BIELEFELD GmbH, Bielefeld (DE)

(72) Inventor: Renzo Melotti, Sala Monferrato (IT)

(73) Assignee: BOBST BIELEFELD GmbH, Bielefeld (DE)

( * ) Notice: Subject to any disclaimer, the term of this patent is extended or adjusted under 35 U.S.C. 154(b) by 384 days.

(21) Appl. No.: 17/633,818

(22) PCT Filed: Jul. 22, 2020

(86) PCT No.: PCT/EP2020/070697
§ 371 (c)(1),
(2) Date: Feb. 8, 2022

(87) PCT Pub. No.: WO2021/028176
PCT Pub. Date: Feb. 18, 2021

(65) Prior Publication Data

US 2022/0297418 A1 Sep. 22, 2022

(30) Foreign Application Priority Data

Aug. 15, 2019 (EP) .................................... 19020475

(51) Int. Cl.
*B41F 13/20* (2006.01)
*B41F 5/24* (2006.01)

(52) U.S. Cl.
CPC ................ *B41F 13/20* (2013.01); *B41F 5/24* (2013.01); *B41P 2213/42* (2013.01)

(58) Field of Classification Search
CPC .. B41F 13/20; B41F 5/24; B41F 13/30; B41P 2213/42
See application file for complete search history.

(56) References Cited

U.S. PATENT DOCUMENTS 6,125,752 A * 10/2000 Freddo ..................... B41F 5/24 101/247
2009/0205520 A1* 8/2009 Schafer .................. B41F 13/26 101/216

FOREIGN PATENT DOCUMENTS

EP 1736698 A2 12/2006

OTHER PUBLICATIONS

International Search Report issued Oct. 15, 2020 in International Application No. PCT/EP2020/070697.

* cited by examiner

*Primary Examiner* — Matthew G Marini
*Assistant Examiner* — Leo T Hinze
(74) *Attorney, Agent, or Firm* — Bookoff McAndrews, PLLC

(57) ABSTRACT

A drum support assembly (30, 32) for a printing machine is presented. It comprises a drum support body (30*a*, 32*a*) having a bearing interface (30*b*, 32*b*) for a drum, a lower guide (34) supporting the drum support body (30*a*, 32*a*) at a lower end thereof, and an upper guide (36) supporting the drum support body (30*a*, 32*a*) at an upper end thereof. Additionally, a pre-tensioning unit (50) is provided pre-tensioning the drum support body (30*a*, 32*a*) against the lower guide (34) and/or the upper guide (36). Furthermore, a printing machine is described, comprising a drum and a drum support assembly (30, 32) as described above.

13 Claims, 3 Drawing Sheets

DRUM SUPPORT ASSEMBLY FOR A PRINTING MACHINE AND PRINTING MACHINE

CROSS-REFERENCE TO RELATED APPLICATION(S)

Figure 1:
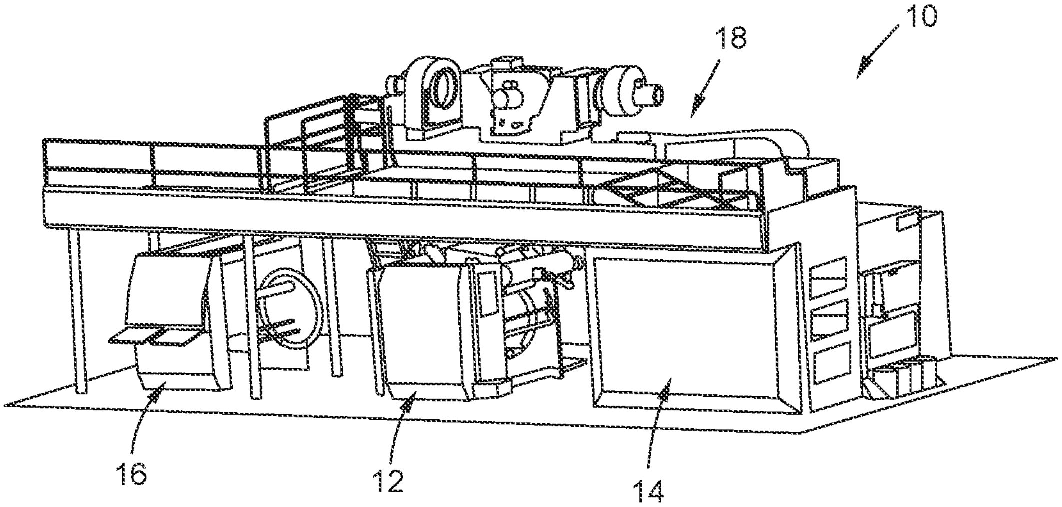

This application is a National Stage Application under of 35 U.S.C. § 371 of International Application No. PCT/EP2020/070697, filed on Jul. 22, 2020, which claims priority to European Application No. 19020475.0, filed on Aug. 15, 2019, the entireties of which are incorporated herein by reference.

The invention relates to a drum support assembly for a printing machine comprising a drum support body having a bearing interface for a drum, a lower guide supporting the drum support body at a lower end thereof, and an upper guide supporting the drum support body at an upper end thereof.

Furthermore, the invention relates to a printing machine, especially a flexographic printing machine, comprising a drum and a drum support assembly as mentioned above, wherein the drum is supported in the drum support assembly via the bearing interface.

Such drum support assemblies and printing machines equipped therewith are known in the art.

In this context the term "drum" is to be understood in a very general manner. Without being limited thereto, in a printing machine a drum may for example be a central impression drum, a cliché roller or an anilox roller.

Thus, a drum support assembly is the part of a printing machine, where a shaft of a drum is mounted. Very often the drum support assembly is also called a "deck".

Such a drum support assembly serves the purpose of supporting the respective drum inside the printing machine. Known drum support assemblies also provide a sliding functionality in order to position the drum supported by the drum support assembly relative to another drum or another element of the printing machine. Additionally, a drum support system shall damp vibrations occurring during the printing process and also compensate wear, defects and thermal expansion of the elements of the printing machine.

The above functionalities of a drum support assembly are conflicting with each other. For example, if the drum support assembly is very rigid and therefore allows for very precise positioning of the drum, usually, it does only provide a reduced dampening functionality. On the other hand, a relatively resilient drum support assembly may compensate wear, defects and thermal expansion up to a high degree but may only provide a reduced positioning precision.

It is therefore an objective of the present invention to provide a drum support assembly, which allows for high positioning precision, high vibration dampening and high compensation of wear, defects and thermal expansion, i.e. a drum support assembly, which solves the conflict mentioned above and provides all described functionalities.

The problem is solved by a drum support assembly as mentioned above, wherein a pre-tensioning unit is provided pre-tensioning the drum support body against the lower guide and/or the upper guide. Such a drum support assembly allows for high precision positioning of a drum in a printing machine, especially in a flexographic printing machine. Simultaneously, such a drum support assembly provides a vibration dampening functionality and is able to compensate defects, thermal expansion and wear. In summary, the drum support assembly according to the invention solves the conflict mentioned above. This is due to the fact that the pre-tensioning unit acts as a damper for vibrations. Vibrations usually enter the drum support assembly via the drum support body. Before they can propagate into the upper or lower guide, they act against the pre-tensioning force provided by the pre-tensioning unit. Consequently, such vibrations are dampened by temporarily and locally altering the pre-tensioning force. At the same time the pre-tensioning unit acts as a compensation unit. In this context the effect of wear, a defects and/or thermal expansion also acts on the pre-tensioning force, i.e. wear, a defect and/or thermal expansion lead to a reduced or increased pre-tensioning force. The functionality of the drum support assembly and the printing machine in which it is used remain unaffected. Furthermore, by pre-tensioning the drum support body against the lower guide and/or the upper guide a reliable and precise positioning of the drum is provided. It has the same effect as a very rigid drum support assembly.

In the present context pre-tensioning the drum support body against the lower guide means that a pre-tensioning force is effective directly between these two elements. For reasons of simple disambiguation effects of this pre-tensioning force on the upper guide are neglected. In an analogous manner, pre-tensioning the drum support body against the upper guide means that the pre-tensioning force is effective directly between these two elements. Further effects of this pre-tensioning force are not considered.

The drum support assembly may be designed such that the drum support body may be able to slide on the upper and/or lower guide.

Preferably, the pre-tensioning unit comprises a pressure piece and a spring element, wherein the spring element is adapted for applying a spring force on the pressure piece and wherein the pressure piece is mounted on the drum support body and frictionally engages the lower guide and/or the upper guide, or wherein the pressure piece is mounted on one of the upper guide and the lower guide and frictionally engages the drum support body. In this context, a spring element has to be understood in a general sense. Consequently, any elastic or resilient element adapted for applying a spring force on the pressure piece is to be considered a spring element. The pre-tensioning force is provided by compressing the spring element. This manner of providing the pre-tensioning force is easy and reliable at the same time. Thus, the drum support assembly is reliable and adapted for long operation times.

According to an embodiment, the pressure piece is made of a polymer or resin. Parts made from such materials are easy to manufacture and therefore cost-effective. At the same time these materials have a low friction coefficient when interacting with the upper guide, the lower guide or the drum support body. This is especially relevant, if a sliding functionality of the drum support body relative to the lower guide and/or the upper guide shall be provided.

The pre-tensioning unit may comprise a pre-tensioning force variation unit being adapted to adjust the pre-tensioning force to a pre-defined value. Such a pre-defined value may represent a certain compromise between the rigidity of the drum support assembly and the resilience thereof. Consequently, the drum support assembly may be adapted to different use cases. The pre-tensioning force variation unit may comprise a screw or another rotatable element, wherein the rotation thereof in one direction increases the pre-tensioning force and the rotation thereof in an opposite direction reduces the pre-tensioning force.

According to another preferred embodiment, the pre-tensioning unit comprises an active system, e.g. a pneumatic piston. Such an embodiment provides the possibility to change the pre-tension according to the actual needs. For example, to reduce the pre-tension during deck movements and increase the pre-tension at deck stop. With an automatically variable preload system (e.g. a pneumatic actuator) the preload may be automatically adjustable according the needs, thereby generating a pre-tensioning force variation adapted to adjust the pre-tensioning force to a several pre-defined values.

The pre-tensioning unit may also comprise more than one pre-tensioning force variation units, which are located in different areas of the pressure piece. This is especially useful if the pressure piece has big dimensions compared to the pre-tensioning force variation unit, e.g. if the pressure piece is elongated or voluminous.

According to a variant the lower guide comprises a lower rail, on which the lower end of the drum support body is supported. The drum support body may be adapted to slide on the lower rail.

Preferably, a low friction material is interposed between the lower rail and the drum support body. In this context, a low friction material is to be understood as a material which reduces friction between the lower rail and the drum support body. The low friction material may comprise metal, polymer or composite material. Alternatively or additionally, it may be a self-lubricating material. In a drum support assembly, a low friction material facilitates the movement of the drum support body relative to the lower guide. In order to generate such a movement, relatively low forces are sufficient.

According to an embodiment, the lower rail has a substantially triangular cross section, when regarded along a main direction of the lower rail, wherein the drum support body is supported on both triangle side surfaces of the cross section. In this context, the main direction of the lower rail is parallel to the sliding direction provided by the rail. The triangular cross section allows for such a sliding movement but prevents a relative movement in other directions, especially perpendicular to the sliding direction. Consequently, the drum support body is supported on the lower rail in a reliable manner.

On the drum support body two counter surfaces may be provided interacting with one of the triangle sides respectively. The counter surfaces essentially define the same angle between each other as the triangle side surfaces.

Also the upper guide may comprise an upper rail, on which the upper end of the drum support body is supported. The drum support body may be adapted to slide on the upper rail.

Advantageously, a low friction material is interposed between the upper rail and the drum support body. The definitions and effects mentioned in connection with the low friction material on the lower rail also apply for the upper rail.

The upper rail can have a substantially triangular cross section, when regarded along a main direction of the upper rail, wherein the drum support body is supported on both triangle side surfaces of the cross section. Also in this case the definitions and effects mentioned in connection with the cross section of the lower rail apply.

In an alternative, a contact surface of the drum support body being in contact with the upper rail comprises a first contact surface portion being provided on the drum support body and a second contact surface portion being provided on the pressure piece, wherein the first contact surface portion and the second contact surface portion are in contact with one triangle side surface respectively. The first contact surface portion and the second contact surface portion substantially define the same angle as the triangle side surfaces of the upper rail. Pre-tensioning of the drum support body thus is achieved by pre-tensioning the pressure piece against the drum support body.

The drum support body may be made of cast iron. Consequently, it is simple to produce by using standard machinery. Furthermore, cast iron offers a good combination of material stability and resilience.

Additionally, the problem is solved by a printing machine, especially a flexographic printing machine, as mentioned above, comprising a drum support assembly according to the invention. By supporting the drum via a drum support assembly according to the invention, it is positioned within the printing machine with high precision. Simultaneously, vibrations occurring in the surroundings of the drum are dampened and defects, thermal expansion and wear are compensated. Consequently, high printing quality is ensured. Additionally, the printing machine may be operated in a cost-effective manner.

The drum may be a central impression drum, a cliché drum or an ink application drum. Often, the ink application drum is also called an anilox drum or anilox roller.

According to an embodiment, the printing machine further comprises an actuation unit being coupled to the drum support assembly and being adapted for moving the drum support body relative to the upper guide and the lower guide. Preferably, the drum support body slides on the upper guide and the lower guide when being actuated. The actuation unit may comprise electric jacks being adapted for moving the drum support body in a substantially horizontal direction in order to configure distances between shafts of the printing machine.

Figure 2:
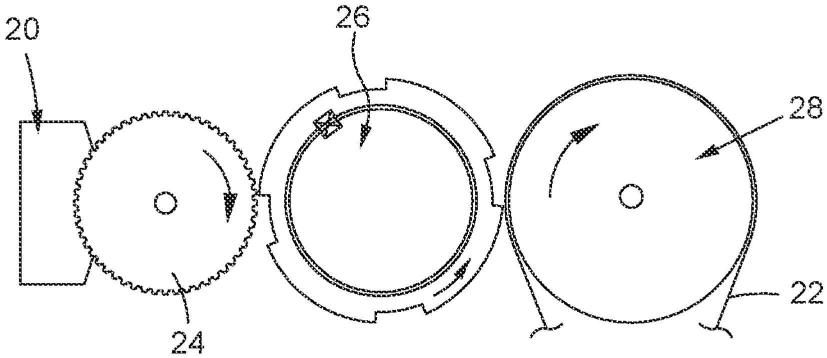
Figure 3:
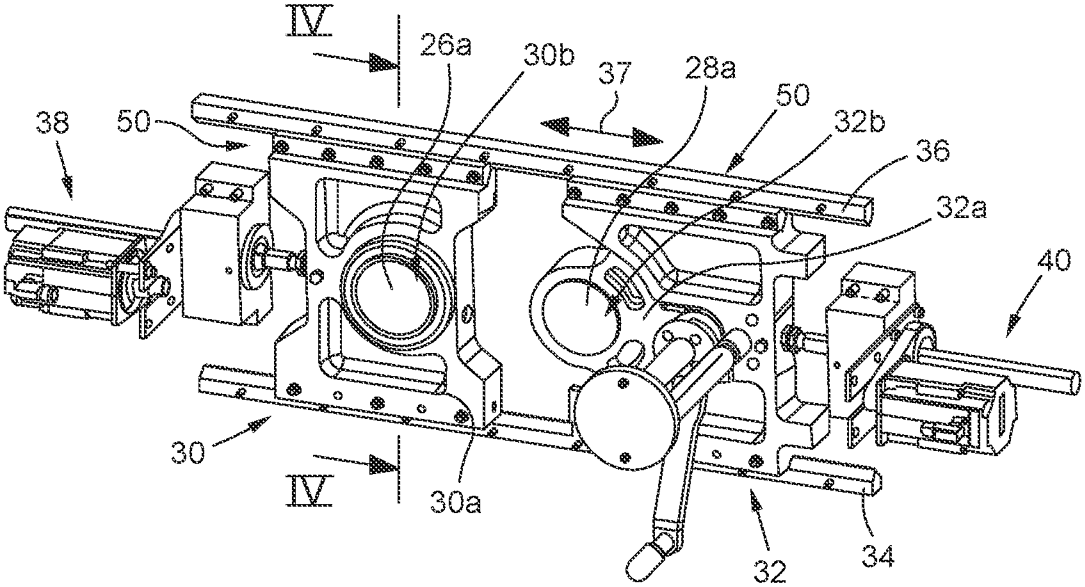
Figure 4:
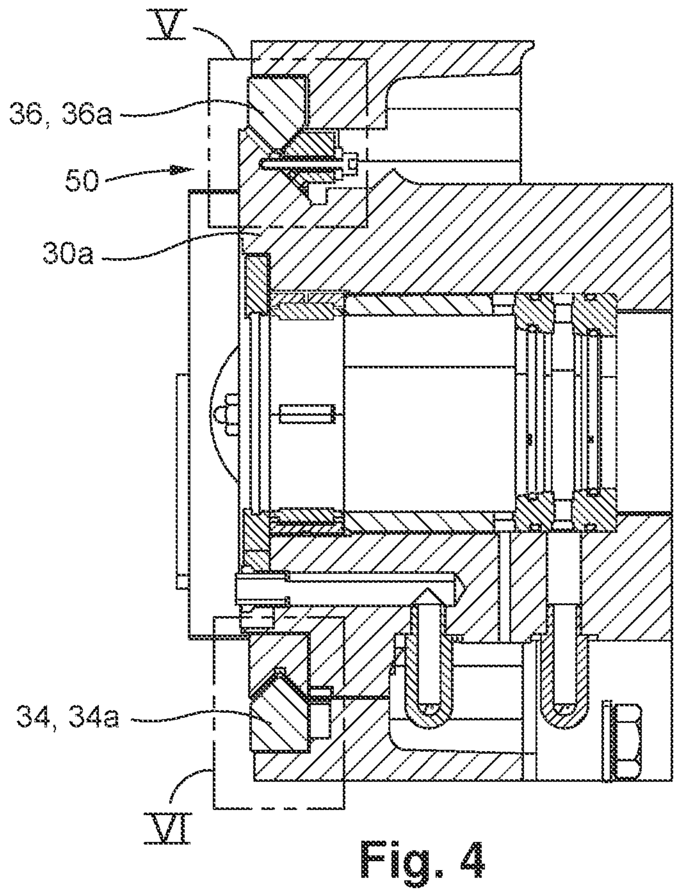
Figure 5:
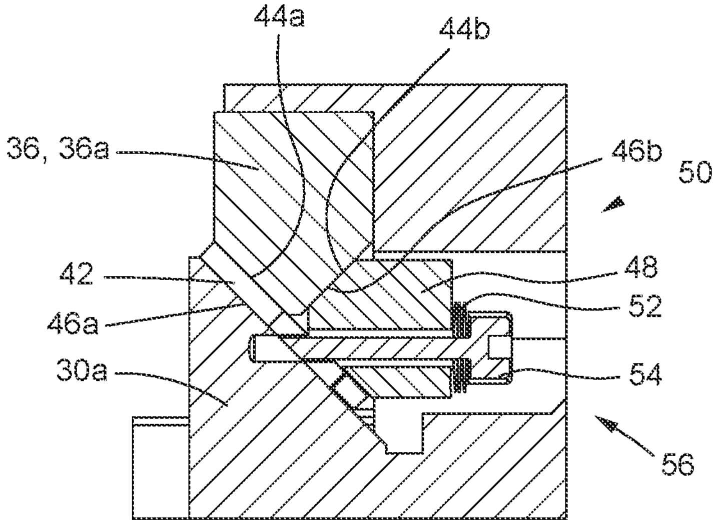
Figure 6:
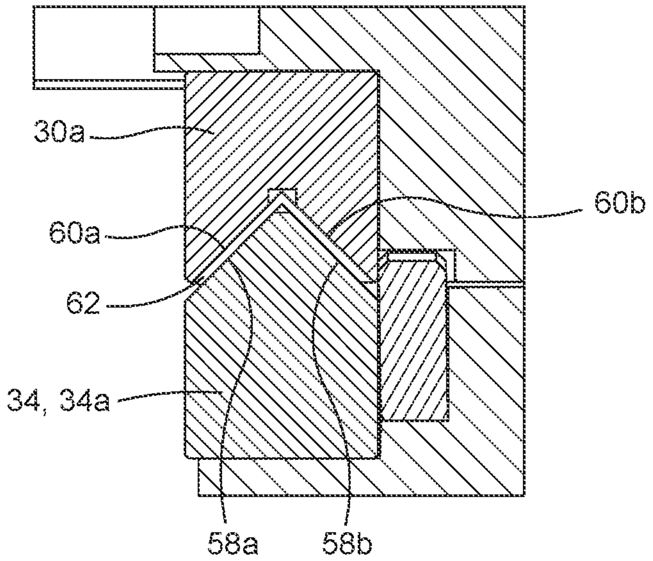

The invention will now be explained with reference to an embodiment which is shown in the attached drawings. In the drawings, FIG. 1 shows a printing machine according to the invention comprising drum support assemblies according to the invention, FIG. 2 shows the functional principle of the printing machine according to FIG. 1, FIG. 3 shows two drum support assemblies of the printing machine of FIG. 1, FIG. 4 shows section IV-IV of FIG. 3, FIG. 5 shows detail V of FIG. 4, and FIG. 6 shows detail VI of FIG. 4.

FIG. 1 shows a printing machine 10, which is a flexographic printing machine in the examples shown.

It comprises a web feeding unit 12, where a web of carrier material may be stored before the printing process takes place, a printing unit 14 adapted for printing on the web of carrier material, and a storage unit 16, where printed web is stored after the printing process.

The printing machine 10 also has a dryer unit 18, which is adapted for drying printed web of carrier material after the printing process.

Details of the printing unit 14 may be seen in FIG. 2.

The printing unit 14 comprises an ink chamber 20, where ink to be applied to a web 22 of support material is stored.

In a first step of the printing process ink is provided to an ink application drum 24, which may also be called an anilox roller. On the outer circumference of this drum a plurality of recesses are provided, which are designed such that they can receive an amount of ink adapted to a print job.

On the side of the ink application drum 24 opposing the ink chamber 20 a cliché drum 26 is provided. On the cliché drum 26 a printing plate is mounted. The printing plate is made of rubber or polymer material and comprises a positive mirrored master of the required image as a 3D relief. The image areas are raised with respect to the non-image areas.

In operation the ink application drum 24 applies ink to the raised areas of the cliché drum 26 in a uniform manner.

Next to the cliché drum 26, a central impression drum 28 or central impression cylinder is mounted.

The web 22 is located between the cliché drum 26 and the central impression drum 28 and both drums 26, 28 are configured such that the image is transferred from the printing plate to the web 22 during operation of the printing machine 10.

All drums 24, 26, 28 are supported inside the printing machine 10 by a respective drum support assembly.

FIG. 3 shows a drum support assembly 30 on which the cliché drum 26 is supported and a drum support assembly 32 on which the central impression drum 28 is supported. It is understood that these drum support assemblies 30, 32 have been chosen for illustrative purposes only. Other drums of the printing machine 10 are supported therein in an analogous manner.

The drums 26, 28 itself are not shown in FIG. 3. Only a shaft 26*a* appertaining to the cliché drum 26 and a shaft 28*a* appertaining to the central impression drum 28 are illustrated.

Each of the drum support assemblies 30, 32 comprises a drum support body 30*a*, 32*a*, wherein each of the drum support bodies 30*a*, 32*a* is equipped with a bearing interface 30*b*, 32*b* for a drum.

In the example shown, both drum support bodies 30*a*, 32*a* are made of cast iron.

In detail, drum support body 30*a* supports shaft 26*a* via the bearing interface 30*b* and drum support body 32 supports shaft 28*a* via bearing interface 32*b*.

Each of the drum support assemblies 30, 32 also comprises a lower guide 34 supporting the respective drum support body 30*a*, 32*a* at a lower end thereof and an upper guide 36 supporting the respective drum support body 30*a*, 32*a* at an upper end thereof.

In the example shown in FIG. 3 the drum support assembly 30 and the drum support assembly 32 make use of a common lower guide 34 and a common upper guide 36.

The drum support bodies 30*a*, 32*a* are able to slide on the upper guide 36 and the lower guide 34 in a direction indicated by arrow 37.

In this context, a sliding movement of the drum support body 30*a* is actuated by a first actuation unit 38 being coupled to the drum support assembly 30 and being adapted for moving the drum support body 30*a* relative to the upper guide 36 and the lower guide 34.

A sliding movement of the drum support body 32*a* is actuated by a second actuation unit 40 being coupled to the drum support assembly 32 and being adapted for moving the drum support body 32*a* relative to the upper guide 36 and the lower guide 34.

Details of the drum support assemblies 30, 32 are shown in FIGS. 4 to 6. For better readability only drum support assembly 30 is described. It is understood that the following explanations apply to drum support assembly 32 in an analogous way.

The upper guide 36 comprises an upper rail 36*a*, on which the upper end of the drum support body 30*a* is supported.

In between the upper rail 36*a* and the drum support body 30*a* a low friction material 42 is interposed.

Furthermore, the upper rail 36*a* has a substantially triangular cross section, when regarded along a main direction of the upper rail 36*a*. This can best be seen in FIG. 5.

The drum support body 30*a* is supported on both triangle side surfaces 44*a*, 44*b* of the cross section.

On the drum support body 30*a*, a first contact surface portion 46*a* is in frictional engagement with the triangle side surface 44*a*.

A second contact surface portion 46*b* is in frictional engagement with the triangle side surface 44*b*. This contact surface portion 46*b* is provided on a pressure piece 48, which is mounted on the drum support body 30*a*.

The pressure piece 48 is part of a pre-tensioning unit 50, which is adapted for pre-tensioning the drum support body 30*a* against the upper guide 36.

Besides the pressure piece 48 the pre-tensioning unit 50 also comprises a spring element 52, wherein the spring element 52 is adapted for applying a spring force on the pressure piece 48. Consequently, the spring element 52 generates a pre-tensioning force, which substantially equals the spring force.

The spring element 52 is fixed to the drum support body 30*a* by a screw 54, which can be used for varying the pre-tensioning force. Consequently, the screw 54 not only is a means for mounting the spring element 52 on the drum support body 30*a* but also constitutes a pre-tensioning force variation unit 56 being adapted to adjust the pre-tensioning force to a pre-defined value.

At the lower end of the drum support body 30*a* the lower guide 34 comprises a lower rail 34*a*, on which the lower end of the drum support body 30*a* is supported.

Also the lower rail 34*a* has a substantially triangular cross section, when regarded along a main direction thereof. This can be seen in FIG. 6.

The drum support body 30*a* is supported on both triangle side surfaces 58*a*, 58*b* of this cross section.

On the drum support body 30*a* respective counter surfaces are provided. A first contact surface portion 60*a* is in frictional engagement with the triangle side surface 58*a* and a second contact surface portion 60*b* is in frictional engagement with the triangle side surface 58*b*.

As has already been explained with respect to the upper guide 36, a low friction material 62 is interposed between the lower rail 34*a* and the drum support body 30*a*. In the example shown the low friction material 62 covers both triangle side surfaces 58*a*, 58*b*.

The invention claimed is:

1. A drum support assembly for a printing machine, the drum support assembly comprising:

a drum support body having a bearing interface for a drum and a body contact surface portion, a lower guide supporting the drum support body at a lower end thereof, an upper guide supporting the drum support body at an upper end thereof, and a pre-tensioning unit for pre-tensioning the drum support body against the lower guide and/or the upper guide, wherein the pre-tensioning unit comprises a pressure piece and a spring element, the pressure piece including a pressure piece contact surface portion, wherein the spring element is adapted for applying a spring force on the pressure piece, wherein the upper guide has a lower end with a substantially triangular cross section including a first side surface and a second side surface, and the lower guide has an upper end with a substantially triangular cross section including a first side surface and a second side surface, wherein the pressure piece is either (1) mounted on the drum support body and frictionally engages one of the upper guide or the lower guide, or (2) mounted on one of the upper guide or the lower guide and frictionally engages the drum support body, and wherein the body contact surface portion contacts the first side surface of the one of the upper guide or the lower guide, and the pressure piece contact surface portion contacts either (1) the second side surface of the one of the upper guide or the lower guide or (2) the body contact surface portion.

2. The drum support assembly according to claim 1, wherein the pre-tensioning unit comprises a pre-tensioning force variation unit being adapted to adjust the pre-tensioning force to a pre-defined value.

3. The drum support assembly according to claim 1, wherein the lower guide comprises a lower rail, on which the lower end of the drum support body is supported.

4. The drum support assembly according to claim 3, wherein a low friction material is interposed between the lower rail and the drum support body.

5. The drum support assembly according to claim 3, wherein the drum support body is supported on both triangle side surfaces of the cross section.

6. The drum support assembly according to claim 1, wherein the upper guide comprises an upper rail, on which the upper end of the drum support body is supported.

7. The drum support assembly according to claim 6, wherein a low friction material is interposed between the upper rail and the drum support body.

8. The drum support assembly according to claim 6, wherein the drum support body is supported on both triangle side surfaces of the cross section.

9. The drum support assembly according to claim 8, wherein the pre-tensioning unit comprises a pre-tensioning force variation unit being adapted to adjust the pre-tensioning force to a pre-defined value.

10. The drum support assembly according to claim 1, wherein the drum support body is made of cast iron.

11. A printing machine comprising:

a drum, and the drum support assembly according to claim 1, wherein the drum is supported in the drum support assembly via the bearing interface.

12. The printing machine according to claim 11, wherein the drum is a central impression drum, a cliché drum or an ink application drum.

13. A drum support assembly for a printing machine, the drum support assembly comprising:

a drum support body having a bearing interface for a drum and a body contact surface portion, a guide supporting the drum support body and having an end with a substantially triangular cross section including a first side surface and a second side surface, and a pre-tensioning unit for pre-tensioning the drum support body against the guide, the pre-tensioning unit including a pressure piece having a contact portion and a spring element adapted for applying a spring force on the pressure piece, wherein the pressure piece is mounted to one of the drum support body or the guide, and frictionally engages the other of the drum support body or the guide, and wherein the body contact surface portion contacts the first side surface of the guide, and the pressure piece contact portion contacts the second side surface of the guide.

* * * * *